United States Patent
Watanabe et al.

(10) Patent No.: US 8,142,632 B2
(45) Date of Patent: Mar. 27, 2012

(54) METHOD OF MANUFACTURING FUEL CELL SEPARATOR, AND FUEL CELL SEPARATOR

(75) Inventors: Yusuke Watanabe, Toyota (JP); Masakazu Suzuki, Toyota (JP); Yoshinobu Kurosaki, Neyagawa (JP)

(73) Assignees: Toyota Jidosha Kabushiki Kaisha, Toyota-Shi (JP); Aisin Takaoka Co., Ltd., Toyota-Shi (JP)

( * ) Notice: Subject to any disclaimer, the term of this patent is extended or adjusted under 35 U.S.C. 154(b) by 394 days.

(21) Appl. No.: 12/474,513

(22) Filed: May 29, 2009

(65) Prior Publication Data

US 2009/0297922 A1    Dec. 3, 2009

(30) Foreign Application Priority Data

May 29, 2008 (JP) ................ 2008-141595

(51) Int. Cl.
*C25D 13/12* (2006.01)
(52) U.S. Cl. ..................... 204/486; 204/510
(58) Field of Classification Search ............ 204/486, 204/510
See application file for complete search history.

(56) References Cited

U.S. PATENT DOCUMENTS

2010/0233584 A1   9/2010   Watanabe et al.

FOREIGN PATENT DOCUMENTS

| JP | 52139152 A | 11/1977 |
|----|------------|---------|
| JP | 61190098 A | 8/1986 |
| JP | 2004059985 | 2/2004 |
| JP | 2007084877 | 4/2007 |
| JP | 2007242576 | 9/2007 |

OTHER PUBLICATIONS

Decision of Final Rejection with partial English translation, Oct. 19, 2010.
Decision for Dismissal of Amendment with partial English translation, Oct. 19, 2010.

*Primary Examiner* — Kishor Mayekar
(74) *Attorney, Agent, or Firm* — Gifford, Krass, Sprinkle, Anderson & Citkowski, P.C.

(57) ABSTRACT

A method of manufacturing a fuel cell separator, the method including: subjecting the peripheral surfaces other than the respective gas passages of a pair of separator substrates formed from stainless steel to a cathodic electrolytic treatment within an alkali solution, thereby forming an iron-based hydrated oxide film on the peripheral surfaces of the pair of separator substrates (S200), conducting a water treatment by wetting the surface of the iron-based hydrated oxide film with water (S202), performing electrodeposition coating of an electrocoating material containing an aqueous resin onto at least one of the water-treated iron-based hydrated oxide films provided on the pair of separator substrates (S204), and baking the aqueous resin obtained by electrodeposition coating (S206).

8 Claims, 9 Drawing Sheets

US 8,142,632 B2

METHOD OF MANUFACTURING FUEL CELL SEPARATOR, AND FUEL CELL SEPARATOR

CROSS-REFERENCE TO RELATED APPLICATIONS

This Application claims priority of Japanese Patent Application No. 2008-141595 filed on May 29, 2008, which is incorporated herein by reference.

TECHNICAL FIELD

The present invention relates to a method of manufacturing a fuel cell separator, and a fuel cell separator. The invention relates particularly to a method of manufacturing a fuel cell separator that has improved adhesion between a separator substrate and a resin coating layer and exhibits excellent durability, and also to a fuel cell separator manufactured using this method.

BACKGROUND ART

As shown in FIG. 10, in a solid polymer fuel cell, an assembly (MEA: Membrane Electrode Assembly) comprising an electrolyte membrane 52 formed from a solid polymer film sandwiched between two electrodes, namely a fuel electrode 50 and an air electrode 54, is itself sandwiched between two separators 40 to generate a cell that functions as the smallest unit, and a plurality of these unit cells are then usually stacked to form a fuel cell stack (FC stack), enabling a high voltage to be obtained.

The mechanism for electric power generation by a solid polymer fuel cell generally involves the supply of a fuel gas such as a hydrogen-containing gas to the fuel electrode (the anode side electrode) 50, and supply of an oxidizing gas such as a gas comprising mainly oxygen ($O_2$) or air to the air electrode (the cathode side electrode) 54. The hydrogen-containing gas is supplied to the fuel electrode 50 through fine passages that have been machined in the surface of the separators 40, and the action of the electrode catalyst causes the hydrogen to dissociate into electrons and hydrogen ions ($H^+$). The electrons flow through an external circuit from the fuel electrode 50 to the air electrode 54, thereby generating an electrical current. Meanwhile, the hydrogen ions ($H^+$) pass through the electrolyte membrane 52 to the air electrode 54, and bond with oxygen and the electrons that have passed through the external circuit, thereby generating reaction water ($H_2O$).

Moreover, the two separators 20 that sandwich the MEA described above perform a role as partitions for separating the hydrogen gas and the oxygen gas, and also have a function of electrically connecting the stacked cells in a series arrangement. Furthermore, fine corrugated passages are formed in the surfaces of the two separators, and these passages function as gas distribution passages for distributing the hydrogen-containing gas and the oxygen-containing gas or air.

One example of the structure of a conventional cell is illustrated in FIG. 11 and FIG. 12. The cross-section along the line A-A' of FIG. 12 is illustrated in FIG. 11.

As illustrated in FIG. 11 and FIG. 12, supply communication holes 12a, 12b and 12c through which the fuel gas, the oxidizing gas and cooling water are supplied, and discharge communication holes 14a, 14b and 14c through which the fuel gas, the oxidizing gas and the cooling water are discharged are provided at the respective ends of the two separators 110 and 120. Moreover, gas passages 152 and 154 that distribute the fuel gas and the oxidizing gas supplied from the supply communication holes 12a and 12b respectively are also provided in the separators 110 and 120 respectively. Furthermore, concave portions 106 and 116 are provided in the opposing surfaces of the separators 110 and 120 respectively, and sealing materials 60a and 60b that isolate the fuel gas and the oxidizing gas are provided on both surfaces at the edges of the assembly (MEA) 30. These sealing materials 60a and 60b are bonded to the two separators 110 and 120 via adhesive materials 70a and 70b respectively, thus completing formation of a cell.

However, in those cases where stainless steel (so-called SUS) is used for the separators, then as illustrated in FIG. 6, a passivation film 22 composed of a chromium oxide film is formed on the surface of an SUS separator substrate 20. On the other hand, in recent years there has been a trend towards using more environmentally friendly materials for the aforementioned adhesives and sealing materials. For example, there is a trend towards replacing conventional solvent-soluble lipophilic resins with highly hydrophilic aqueous resins. However, the passivation film 22 described above exhibits poor affinity for these types of aqueous resins. Accordingly, when the above aqueous resins are bonded directly to the SUS separator substrate 20, either as an adhesive or as a sealing material that requires no adhesive, the bonding strength is poor, meaning that when a plurality of fuel cells each having an aforementioned assembly sandwiched between a pair of separators are stacked together and pressure is applied via the manifolds to effect stack fastening, shearing stress is generated which can cause peeling of the resin. Furthermore, thermal expansion or the like generated during use of the fuel cell stack can also cause peeling of the resin, and in some cases there is a possibility that resin detachment may occur.

Furthermore, as illustrated in FIG. 13, in those cases where electrodeposition coating is used to form an aqueous resin on a SUS separator substrate 20 having a passivation film 22 composed of a chromium oxide film formed on the surface thereof, then as shown in FIG. 6, the affinity between the passivation film 22 and the resulting aqueous resin layer 26 is poor. As a result, when the SUS separator substrate 20 is dipped in the bath of the electrodeposition coating material, air tends to be incorporated, and the electrodeposition coating occurs with residual air bubbles 23 trapped at the surface of the SUS separator substrate 20, as shown in FIG. 7. As a result, a multitude of pinholes 27 having diameters from 50 to 100 μm are generated within the formed aqueous resin layer 26.

Accordingly, a method has been proposed in which an iron-based hydrated oxide film having a high affinity for both the passivation film formed on the surface of the SUS separator substrate and the aqueous resin layer is provided between the passivation film and the aqueous resin layer, and this iron-based hydrated oxide film enables the passivation film and the aqueous resin layer to be bound tightly together, forming a fuel cell separator having superior adhesion between the SUS separator substrate and the aqueous resin layer (for example, see JP 2007-242576 A).

Furthermore, another electrodeposition coating method has been proposed in which an anti-foaming agent is adhered to the surface of the object to be coated, prior to the electrodeposition coating, thereby reducing the incorporation of air during dipping of the object to be coated into the electrodeposition coating bath and suppressing the adhesion of air bubbles to the surface of the object to be coated within the bath, and as a result, localized non-adhesion of the electrodeposition coating material is prevented, and the occurrence of film defects such as pinholes in the electrodeposition coating film can be inhibited (for example, see JP 2007-84877 A).

Furthermore, JP 2004-59985 A discloses a wafer plating method in which during a plating treatment of the surface of a wafer that functions as a substrate, the wafer is first wetted with either water or a mixture of water and a surfactant, before being dipped in a plating liquid to effect the plating treatment.

SUMMARY OF THE INVENTION

In recent years, as the demand for fuel cells has grown, improvements in the durability of the fuel cells are also being demanded.

The present invention has been developed in light of the circumstances described above, and provides a method of manufacturing a fuel cell separator having superior durability, the method comprising: forming an iron-based hydrated oxide film that exhibits superior adhesion to resin layers on a separator substrate in advance, subjecting the iron-based hydrated oxide film to a water treatment prior to formation of a resin layer in order to improve the wetting properties of the iron-based hydrated oxide film and the resin layer, and then forming a resin layer on the iron-based hydrated oxide film.

The method of manufacturing a fuel cell separator and the thus produced fuel cell separator of the present invention have the features described below.

(1) According to an aspect of the present invention, there is provided a method of manufacturing a fuel cell separator, the method comprising: subjecting the peripheral surfaces other than the respective gas passages of a pair of separator substrates formed from stainless steel to a cathodic electrolytic treatment within an alkali solution, thereby forming an iron-based hydrated oxide film on the peripheral surfaces of the pair of separator substrates, conducting a water treatment by wetting the surface of the iron-based hydrated oxide film with water, and performing electrodeposition coating of an electrocoating material comprising an aqueous resin onto at least one of the water-treated iron-based hydrated oxide films provided on the pair of separator substrates.

Because the iron-based hydrated oxide film formed by the cathodic electrolytic treatment in an alkali solution is formed on top of the passivation film that exists on the surface of the stainless steel separator substrate, the electrolytically treated separator substrate is able to retain the corrosion resistance that the separator substrate exhibited prior to the electrolytic treatment. Moreover, because the compositions of the iron-based hydrated oxide film and the passivation film on the separator substrate are similar, they bind tightly together via metal bonding. Furthermore, by including the water treatment in which the surface of the iron-based hydrated oxide film is wetted with water, the wetting properties of the surface of the iron-based hydrated oxide film and the electrocoating material comprising an aqueous resin are enhanced. As a result, when the separator substrate is dipped in a bath of the electrocoating material comprising the aqueous resin, air bubbles are unlikely to adhere to the surface of the iron-based hydrated oxide film formed on the separator substrate, meaning that by performing uniform electrodeposition coating of the electrocoating material comprising the aqueous resin onto the surface of the iron-based hydrated oxide film, the aqueous resin can be deposited on the surface while the occurrence of pinholes caused by air bubble remnants can be suppressed or prevented. In addition, because the iron-based hydrated oxide film is able to bond, for example via hydrogen bonding, to the hydrophilic functional groups of the aqueous resin that forms the resin layer formed on top of the hydrated oxide film, the adhesion between the iron-based hydrated oxide film and the resin layer is also excellent. Accordingly, when a plurality of individual fuel cells are subjected to stack fastening, even if shearing stress occurs, peeling of the resin can be prevented. Furthermore, even if thermal expansion or the like occurs during use of the fuel cell stack, because the adhesion between the resin and the separator substrate is excellent, there is no possibility of peeling or detachment of the resin. As a result, the sealing effect between the separators provided by the resin layer can be improved, resulting in an improvement in the durability of the obtained fuel cell.

(2) According to another aspect of the present invention, there is provided the method of manufacturing a fuel cell separator described in (1) above, wherein the alkali solution is an electrolytic treatment solution, the electrolytic treatment solution is either a 5 to 50% by weight solution of sodium hydroxide, or an aqueous solution prepared by adding 0.2 to 20% by weight of trisodium phosphate dodecahydrate and 0.2 to 20% by weight of sodium carbonate as buffers to a 5 to 50% by weight solution of sodium hydroxide, the solution temperature is within a range from 20 to 95° C., the current density is not less than 0.5 A/dm$^2$, and the treatment time is not less than 10 seconds.

By conducting a cathodic electrolytic treatment under the conditions described above, a uniform iron-based hydrated oxide film can be formed.

(3) According to yet another aspect of the present invention, there is provided the method of manufacturing a fuel cell separator described in (1) or (2) above, wherein the water is an ion-exchanged water.

By using an ion-exchanged water, the introduction of impurities into the electrocoating material bath via the separator substrate and the accumulation of impurities within the bath can be prevented, enabling more stable electrodeposition coating to be conducted over an extended period.

(4) According to yet another aspect of the present invention, there is provided the method of manufacturing a fuel cell separator described in any one of (1) to (3) above, wherein the aqueous resin contained within the electrocoating material is a polyamide-based resin.

Polyamide-based resins contain amide groups that act as hydrophilic functional groups, and therefore exhibit excellent affinity for the iron-based hydrated oxide film formed on the separator substrate, resulting in excellent adhesion of the resin to the iron-based hydrated oxide film on the separator substrate. The iron-based hydrated oxide film is a mixed composition containing iron hydroxide and iron oxide, and therefore a multitude of hydroxyl groups that are capable of undergoing hydrogen bonding with the amide groups in a polyamide-based resin are scattered across the surface of the iron-based hydrated oxide film. Accordingly, the polyamide-based electrodeposition resin is readily compatible with the iron-based hydrated oxide film on the separator substrate, enabling the formation of a resin layer of uniform thickness, and enabling a satisfactory separator sealing effect to be achieved with a thinner resin layer than is conventionally possible.

(5) According to yet another aspect of the present invention, there is provided a fuel cell separator, wherein an iron-based hydrated oxide film is formed on the peripheral surfaces other than the respective gas passages of a pair of separator substrates formed from stainless steel by subjecting the peripheral surfaces of the pair of separator substrates to a cathodic electrolytic treatment within an alkali solution, and a resin layer obtained from an electrocoating material comprising an aqueous resin is formed on at least one of the iron-based hydrated oxide films provided on one of the pair of separator substrates, and wherein the number of pinholes having a diameter of 50 to 100 μm per unit surface area of 10 cm×10 cm square of the resin layer is not more than 4.

As described above, because the iron-based hydrated oxide film formed by the cathodic electrolytic treatment within an alkali solution is formed on top of the passivation film that exists on the surface of the stainless steel separator substrate, the electrolytically treated separator substrate is able to retain the corrosion resistance that the separator substrate exhibited prior to the electrolytic treatment. Moreover, because the compositions of the iron-based hydrated oxide film and the passivation film on the separator substrate are similar, they bind tightly together via metal bonding. On the other hand, because the iron-based hydrated oxide film is able to bond, for example via hydrogen bonding, to the hydrophilic functional groups of the aqueous resin that forms the resin layer formed on top of the hydrated oxide film, the adhesion between the iron-based hydrated oxide film and the resin layer is also excellent. Accordingly, when a plurality of individual fuel cells are subjected to stack fastening, even if shearing stress occurs, peeling of the resin can be prevented. Furthermore, even if thermal expansion or the like occurs during use of the fuel cell stack, because the adhesion between the resin and the separator substrate is excellent, there is no possibility of peeling or detachment of the resin. In addition, because the number of pinholes having a diameter of 50 to 100 μm per unit surface area of 10 cm×10 cm square of the resin layer is not more than 4, the sealing effect between the separators provided by the resin layer can be improved, resulting in an improvement in the durability of the obtained fuel cell.

(6) According to yet another aspect of the present invention, there is provided the fuel cell separator described in (5) above, wherein the aqueous resin is a polyamide-based resin.

As described above, polyamide-based resins contain amide groups that act as hydrophilic functional groups, and therefore exhibit excellent affinity for the iron-based hydrated oxide film formed on the separator substrate, resulting in excellent adhesion of the resin to the iron-based hydrated oxide film on the separator substrate. The iron-based hydrated oxide film is a mixed composition containing iron hydroxide and iron oxide, and therefore a multitude of hydroxyl groups that are capable of undergoing hydrogen bonding with the amide groups in a polyamide-based resin are scattered across the surface of the iron-based hydrated oxide film. Accordingly, the polyamide-based resin is readily compatible with the iron-based hydrated oxide film on the separator substrate, enabling the formation of a resin layer of uniform thickness, and enabling a satisfactory separator sealing effect to be achieved with a thinner resin layer than is conventionally possible. Furthermore, because there are a large number of bonding points between the iron-based hydrated oxide film and the polyamide-based resin, the occurrence of pinholes can be suppressed or prevented.

According to the present invention, the formation of air bubble remnants within the aqueous resin layer obtained by electrodeposition coating can be suppressed or prevented, and because the adhesion between the separators that are bonded together via the resin layer is excellent, a fuel cell having excellent corrosion resistance and superior durability can be provided.

BRIEF DESCRIPTION OF THE DRAWINGS

Embodiment(s) of the present invention will be described in detail based on the following figures, wherein.

DETAILED DESCRIPTION OF THE PREFERRED EMBODIMENTS

Embodiments of the present invention are described below with reference to the drawings.

[Method of Manufacturing Fuel Cell Separator]

A description of a preferred embodiment of the fuel cell separator according to the present invention is presented below.

Figure 1:
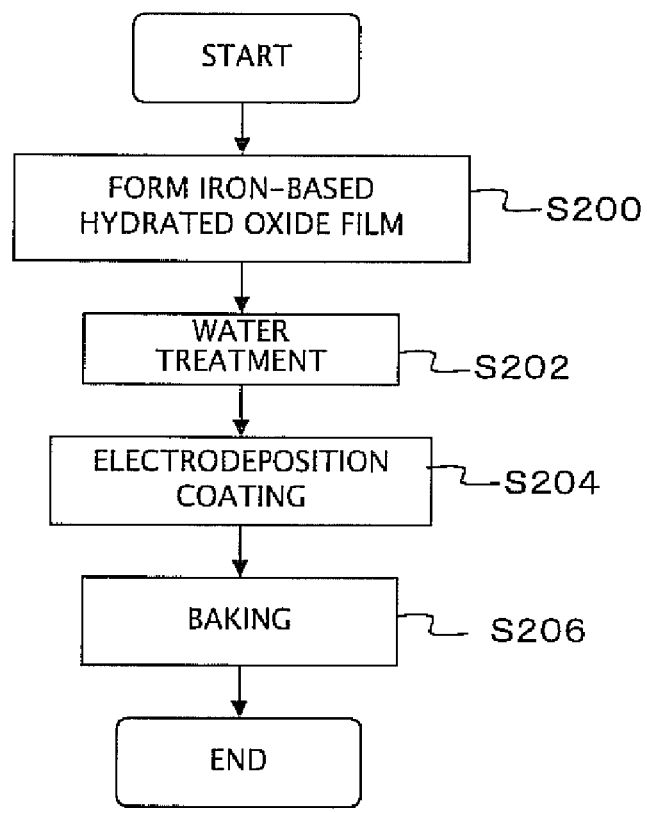
FIG. 1 is a flowchart illustrating one example of the steps within a method of manufacturing a fuel cell separator according to the present invention.

As shown in FIG. 1, a method of manufacturing a fuel cell separator according to this embodiment comprises: subjecting the peripheral surfaces other than the respective gas passages of a pair of separator substrates formed from stainless steel to a cathodic electrolytic treatment within an alkali solution, thereby forming an iron-based hydrated oxide film on the peripheral surfaces of the pair of separator substrates (S200), conducting a water treatment by wetting the surface of the iron-based hydrated oxide film with water (S202), performing electrodeposition coating of an electrocoating material comprising an aqueous resin onto at least one of the water-treated iron-based hydrated oxide films provided on the pair of separator substrates (S204), and where necessary, baking the aqueous resin layer (S206).

Each of the steps of the method of manufacturing a fuel cell separator according to the present embodiment is described below in detail, using FIG. 2 to FIG. 8.

First is a description of the step of forming the iron-based hydrated oxide film (S200 in FIG. 1). Examples of the material for a SUS separator substrate 20 shown in FIG. 2 include stainless steels including austenite-based stainless steels such as SUS304, SUS305, SUS310, SUS316 and SUSMX7, ferrite-based stainless steels such as SUS430, martensite-based stainless steels such as SUS403, SUS410, SUS416 and SUS420, and precipitation hardened stainless steels such as SUS631.

Figure 2:
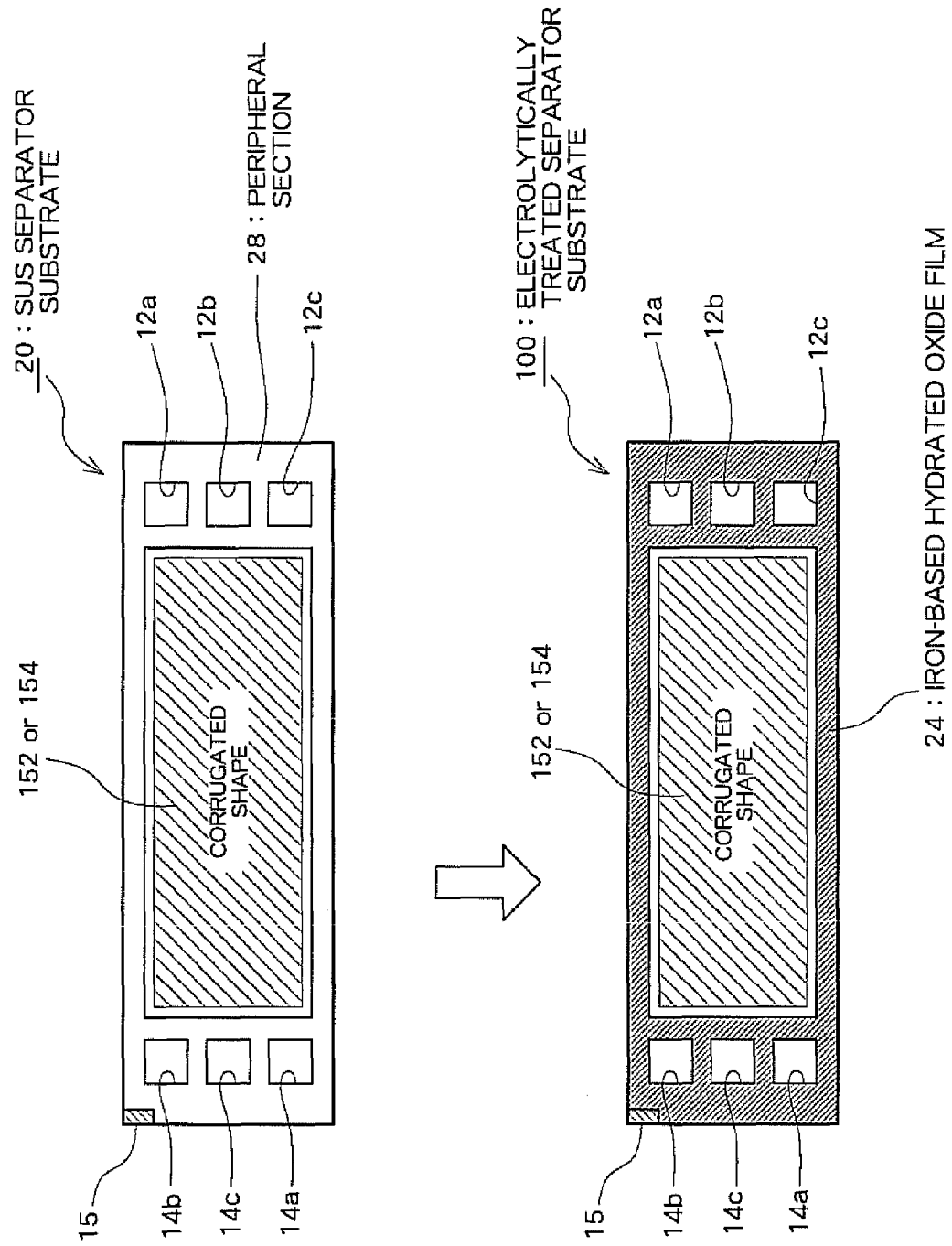
FIG. 2 is a diagram describing a cathodic electrolytic treatment region for a fuel cell separator of the present invention.

In the present embodiment, as shown in FIG. 2, supply communication holes 12a, 12b and 12c through which the fuel gas, the oxidizing gas and cooling water respectively are supplied, and discharge communication holes 14a, 14b and 14c through which the fuel gas, the oxidizing gas and the cooling water are discharged are provided at the respective ends of the SUS separator substrate 20. Moreover, the SUS separator substrate 20 is also provided with corrugated gas passages 152 or 154 for carrying the fuel gas or the oxidizing gas supplied from the supply communication hole 12a or 12b respectively.

In the present embodiment, a cathodic electrolytic treatment is used to form an iron-based hydrated oxide film on a peripheral section of the SUS separator substrate 20 that excludes the masked gas passages 152 or 154, namely the peripheral end sections of the supply communication holes 12a, 12b and 12c through which the fuel gas, the oxidizing gas and cooling water are supplied, and the discharge communication holes 14a, 14b and 14c through which the fuel gas, the oxidizing gas and the cooling water are discharged, together with the sealing region used for bonding the separators. This iron-based hydrated oxide film is composed of a mixture of iron hydroxide and iron oxide, and as described below, the step of forming this iron-based hydrated oxide film (S200 in FIG. 1, hereafter also referred to as a "super hydrophilic treatment") is a treatment for bonding hydroxyl groups (OH groups) to iron and chromium. As shown in FIG. 2, the resulting electrolytically treated separator 100 has an iron-based hydrated oxide film 24 formed on the peripheral section that excludes the gas passages 152 or 154.

The masking mentioned above may be performed by bonding a substantially rectangular removable sealing film that prevents penetration of the electrolytic liquid on top of the gas passages of the SUS separator substrate 20. Furthermore, conventional masking methods may also be used, such as a method in which an insulating resin is applied to the gas passages of the SUS separator substrate 20 and subsequently solidified.

The cathodic electrolytic treatment of the present embodiment is conducted within an electrolytic treatment solution composed of an alkali solution, by connecting an electrode connection section 15 of the SUS separator substrate 20 shown in FIG. 2 to a cathode so that the work composed of the SUS separator substrate 20 acts as the cathode, using iron or a an aforementioned stainless steel as the anode, and then forming an iron-based hydrated oxide film of a predetermined thickness. In those cases where a stainless steel is used as the anode, a ferrite-based stainless steel having a nickel content of less than 3% by weight is preferred.

In terms of the conditions for the aforementioned cathodic electrolytic treatment, the alkali solution functions as the electrolytic treatment solution, the electrolytic treatment solution is either a 5 to 50% by weight solution of sodium hydroxide, or a buffered aqueous solution prepared by adding 0.2 to 20% by weight of trisodium phosphate dodecahydrate and 0.2 to 20% by weight of sodium carbonate as buffers to a 5 to 50% by weight solution of sodium hydroxide, the solution temperature is within a range from 20 to 95° C., the current density is not less than 0.5 A/dm$^2$, and the treatment time is not less than 10 seconds.

The reasons that the above ranges are preferred for the electrolytic treatment conditions are as follows. Namely, if the concentration of sodium hydroxide is less than 5% by weight, the concentration of trisodium phosphate dodecahydrate is less than 0.2% by weight and/or the concentration of sodium carbonate is less than 0.2% by weight, then forming an effective uniform iron-based hydrated oxide film on the surface of the SUS separator substrate 20 is difficult, and there is a possibility that the adhesion to the subsequently bonded aqueous resin may weaken. Furthermore, if the concentration of sodium hydroxide exceeds 50% by weight, the concentration of trisodium phosphate dodecahydrate exceeds 20% by weight and/or the concentration of sodium carbonate exceeds 20% by weight, then degradation of the electrolytic solution tends to be quite marked, and the treatment is also economically unviable. Furthermore, if the solution temperature is less than 20° C., then the formation of the iron-based hydrated oxide film tends to be inadequate, whereas if the temperature exceeds 95° C., then the time taken for formation of the iron-based hydrated oxide film shortens considerably, and although this results in lower power consumption, controlling the concentration of the electrolytic solution tends to be difficult, and there is an increased chance that the formed film may lack uniformity. Moreover, if the current density is less than 0.5 A/dm$^2$ or the treatment time is less than 10 seconds, then the formation of the iron-based hydrated oxide film tends to be inadequate, and there is a possibility that the adhesion to the subsequently bonded aqueous resin may weaken.

In the cathodic electrolytic treatment of the present embodiment, the reason for masking the gas passages region of the separator substrate is as follows. Namely, hypothetically, if the cathodic electrolytic treatment were to be conducted without performing the above masking, then the iron-based hydrated oxide film would also be formed within the gas passages region. Moreover, as described above, an individual fuel cell is formed by sandwiching an assembly between a pair of separators, and a fuel cell stack is then formed by stacking a plurality of these individual fuel cells. If this fuel cell stack was then used, and the fuel gas or oxidizing gas was distributed through the gas passages, then there is a chance that iron hydroxide or iron oxide from the iron-based hydrated oxide film formed within the gas passages region would be gradually eluted into the assembly comprising the electrolyte membrane composed of a solid polymer electrolyte sandwiched between two electrodes, namely the fuel electrode and the air electrode, leading to a gradual deterioration in the fuel cell. Accordingly, in the present embodiment, the gas passages region of the separator substrate is masked so that during the aforementioned cathodic electrolytic treatment, the iron-based hydrated oxide film is not formed within the gas passages region.

Figure 5:
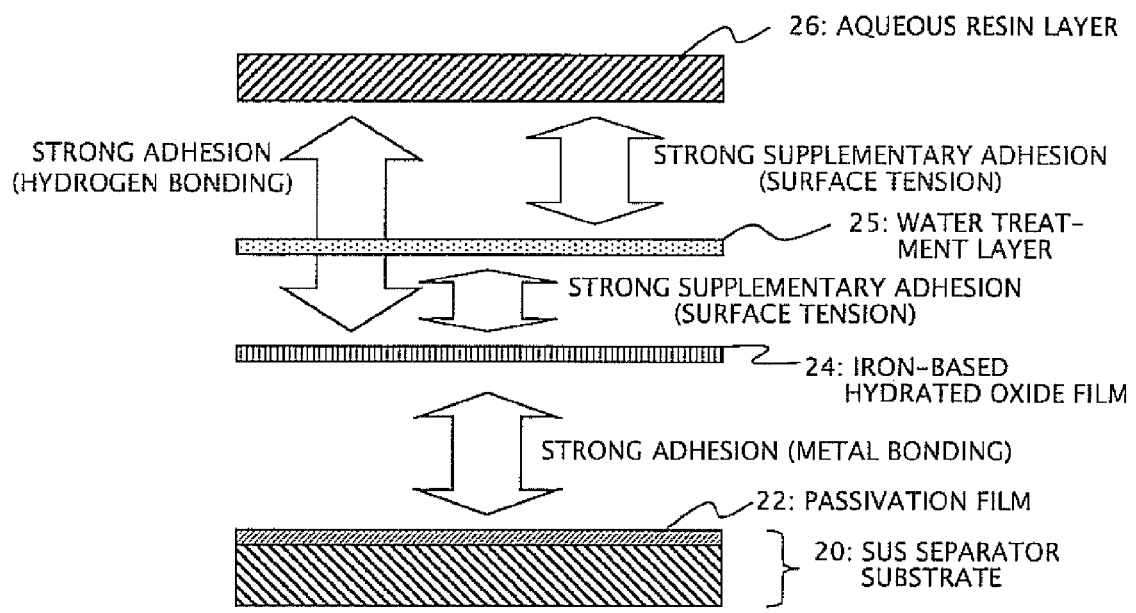
FIG. 5 is a schematic illustration describing the bonding forces between an iron-based hydrated oxide film and an aqueous resin layer in a fuel cell separator of the present invention.
Figure 6:
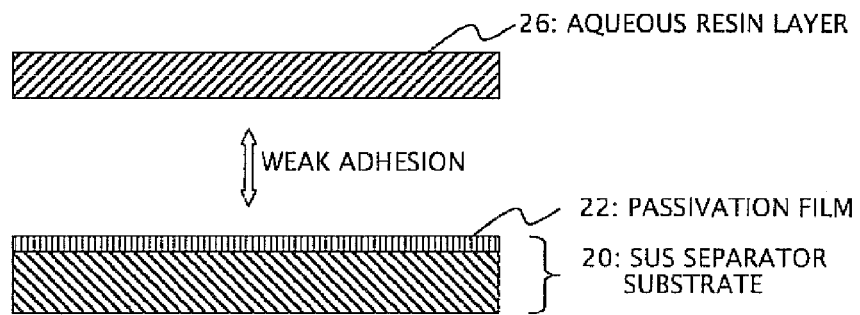
FIG. 6 is a schematic illustration describing the bonding forces between an SUS surface and an aqueous resin layer in a conventional fuel cell separator.
Figure 7:
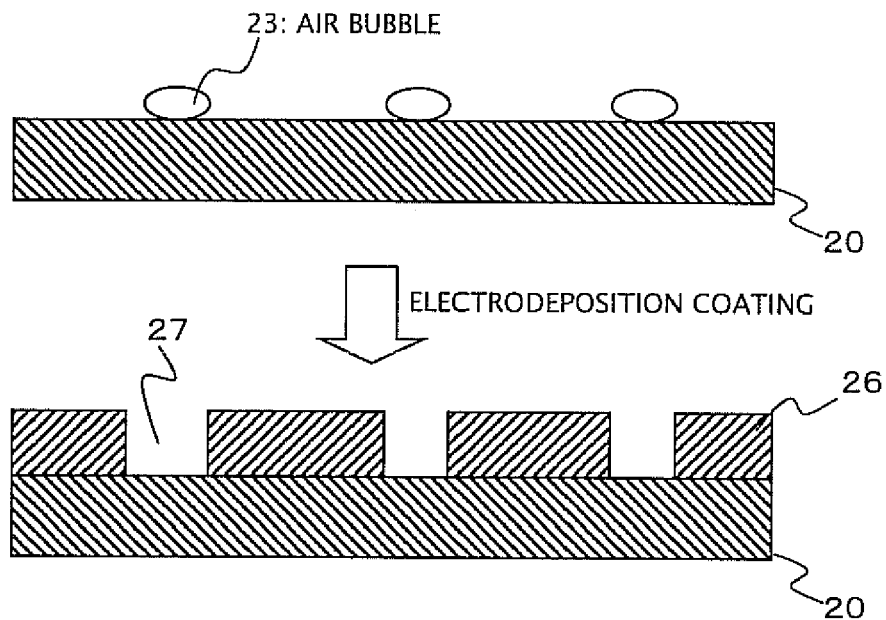
FIG. 7 is a schematic illustration describing a mechanism for the generation of pinholes within an aqueous resin layer.

Furthermore, in the present embodiment, the cathodic electrolytic treatment in the alkali solution is conducted with the work composed of the SUS separator substrate 20 as the cathode. Accordingly, as shown in FIG. 5, the aforementioned iron-based hydrated oxide film 24 is formed on the passivation film 22 composed of a chromium oxide film that exists on the surface of the SUS separator substrate 20. The thickness of this iron-based hydrated oxide film 24 is a maximum of 10 nm. Furthermore, as shown in FIG. 5, the iron-based hydrated oxide film 24 formed by the cathodic electrolytic treatment in the aforementioned alkali solution is formed on the passivation film 22 that exists on the surface of the SUS separator substrate 20, and because the hydroxyl groups (OH groups) bond to the iron and the chromium, the electrolytically treated separator substrate 100 (see FIG. 2) is able to retain the corrosion resistance that the separator substrate 20 exhibited prior to the electrolytic treatment. Moreover, because the compositions of the iron-based hydrated oxide film 24 and the passivation film 22 on the separator substrate are similar, they bind tightly together via metal bonding.

If the electrolytic treatment in the alkali solution were to be conducted with the SUS separator substrate 20 acting as the anode, then the passivation film formed on the SUS separator substrate 20 would be eluted, and the iron within the SUS would also be eluted, meaning an iron oxide film would be formed. In such a case, the passivation film would disappear, meaning the corrosion resistance would likely deteriorate. Furthermore, if the electrolytic treatment were to be conducted in an acidic solution with the SUS separator substrate acting as the anode, then as above, the passivation film would be eluted, and the chromium within the SUS would also be eluted, resulting in the formation of a chromium oxide film. In such a case, because the chromium oxide film would act as a passivation film, the structure would exhibit favorable corrosion resistance, but the wetting properties of the surface relative to aqueous resins would remain poor. Accordingly, in the present embodiment, it is preferable that the electrolytic treatment is conducted in an alkali solution with the SUS separator substrate 20 acting as the cathode.

Figure 8:
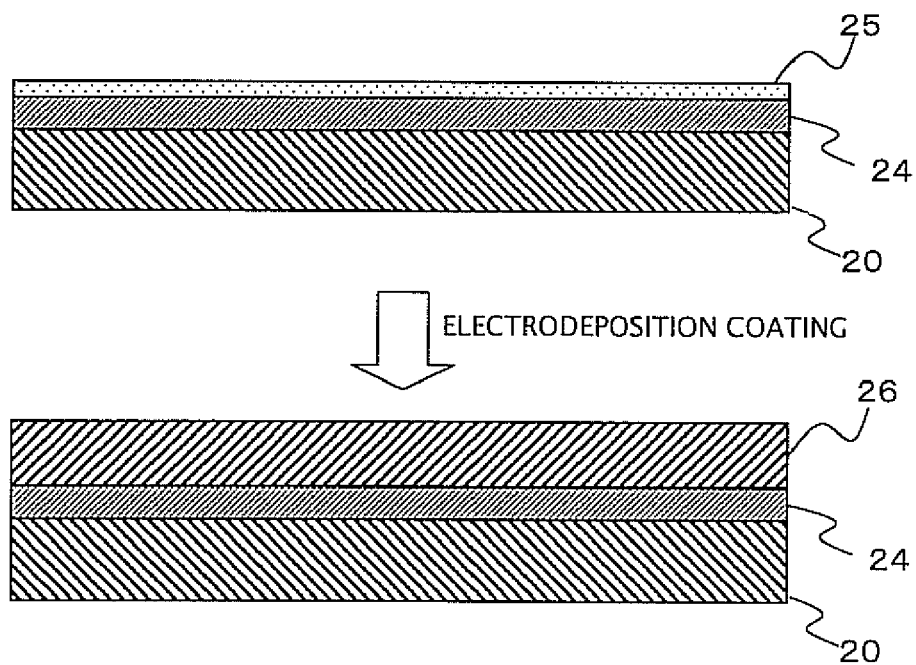
FIG. 8 is a schematic illustration describing a mechanism for ensuring no residual air bubbles by forming a water treatment layer.

Next, with the gas passages and the back surface of the electrolytically treated separator substrate 100 (FIG. 2) on the opposite side to the assembly-sandwiching surface both masked with a masking material 29, the electrolytically treated separator substrate is suspended while the surface of the iron-based hydrated oxide film on the electrolytically treated separator substrate is wetted with water, thereby regulating the surface tension of the iron-based hydrated oxide film (S202 in FIG. 1). The electrocoating material contains a resin that also exhibits hydrophilic properties. On the other hand, the iron-based hydrated oxide film is a super hydrophilic film. Accordingly, as illustrated in FIG. 5, by interposing a temporarily formed water treatment layer 25 (a so-called "water layer") on the surface of the iron-based hydrated oxide film 24, the wetting properties relative to the electrocoating material can be improved. This means that, as illustrated in FIG. 8, when the masked electrolytically treated separator substrate is dipped in an electrodeposition bath, the problem of air bubbles remaining on the surface of the iron-based hydrated oxide film 24 of the electrolytically treated separator substrate can be suppressed or prevented, and as a result, the electrodeposition coating described below can be conducted more favorably.

The water treatment in which the surface is wetted with water may comprise either a shower water washing process or a water tank dipping process, although if factors such as the purity of the water and the desirability of reducing the amount of water used are taken into consideration, then a shower water washing process is preferred. Furthermore, the water used is preferably an ion-exchanged water, and for example, an ion-exchanged water having an electrical conductivity of not more than 10 µS/cm is preferred.

Figure 3:
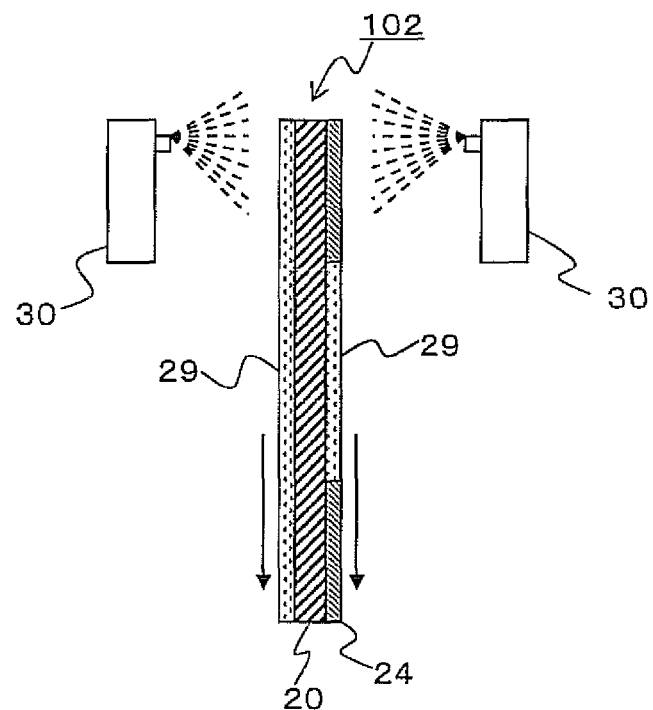
FIG. 3 is diagram describing a water treatment using a shower water washing system in a method of manufacturing a fuel cell separator of the present invention.

One example of the structure of an apparatus used in the shower water washing described above is illustrated in FIG. 3. As shown in FIG. 3, water is sprayed from sprayers 30 onto both surfaces of the work 102 that has been masked with the masking material 29, namely the assembly-sandwiching surface and the opposite surface, and the water is allowed to flow across the surfaces of the work 102 (for example in the directions indicated by the black arrows in FIG. 3). The shower water washing time is typically within a range from 1 second to 5 minutes, and is preferably approximately 60 seconds. If the washing time is less than 1 second, then the surface tension of the entire surface of the iron-based hydrated oxide film 24 of the work 102 cannot be improved by the water. As a result, air tends to be incorporated when the work 102 is dipped in the bath filled with the electrocoating material, meaning that in a similar manner to that shown in FIG. 7, the electrodeposition coating tends to proceed with residual air bubbles retained on the surface of the iron-based hydrated oxide film 24 of the work 102, causing pinholes within the formed aqueous resin layer. In contrast, if the washing time exceeds 5 minutes, then no further improvement in the surface tension can be expected, and the amount of water used simply increases, which is undesirable from an economic viewpoint. Furthermore, the water may be sprayed onto the top portion of the suspended work 102 for at least half of the predetermined water spraying time, with the spraying position then moved gradually down the work 102. In such a case, even if the volume of water sprayed is not particularly large, the water can still be made to flow over substantially the entire surface of the work 102, thus improving the wettability of the surface.

Figure 4:
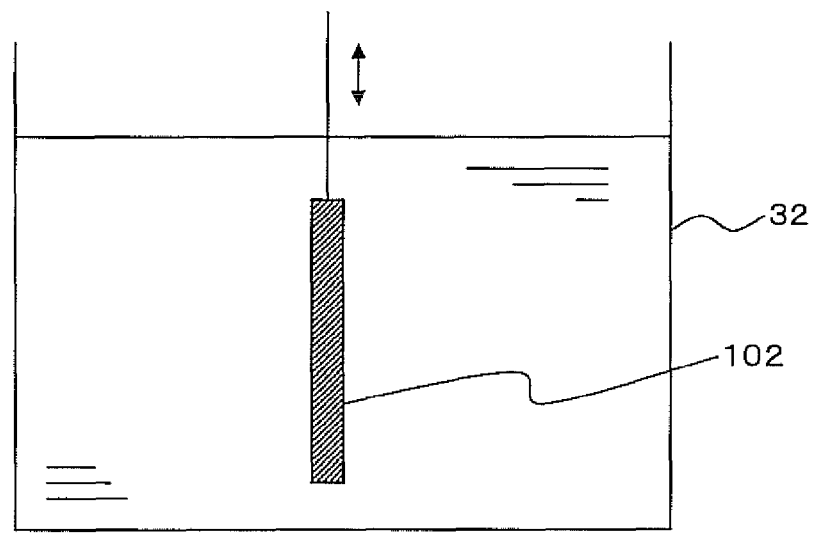
FIG. 4 is diagram describing a water treatment using a water dipping tank in a method of manufacturing a fuel cell separator of the present invention.

FIG. 4 illustrates one example of the structure of an apparatus used in the water tank dipping process described above. As shown in FIG. 4, the work 102 is dipped into a water tank 32, thereby wetting the entire surface of the iron-based hydrated oxide film of the work 102 with water and regulating the surface tension. In a similar manner to that described for the shower washing process, the dipping time is typically within a range from 1 second to 5 minutes, and is preferably approximately 60 seconds. Furthermore, during the dipping process, by gently lowering and raising the work 102 (in the direction of the arrow shown in FIG. 4), any air bubbles retained on the surface of the iron-based hydrated oxide film 24 can be removed.

Following completion of the water treatment, an aqueous resin layer 26 is formed on the iron-based hydrated oxide film 24 (S204 in FIG. 1). In this case, the resin layer is formed with the gas passages and the back surface of the electrolytically treated separator substrate 100 (FIG. 2) on the opposite side to the assembly-sandwiching surface both masked with a masking material 29, in a similar manner to that described above.

With the masked electrolytically treated separator substrate 100 (FIG. 2) acting as the cathode, the substrate is dipped in an electrocoating material for forming the aforementioned aqueous resin layer 26, and by applying a direct current between the cathode and a counter electrode, an aqueous resin layer 26 can be formed on top of the iron-based hydrated oxide film 24 by cationic electrodeposition. By designating a plurality of locations within the region that corresponds with the back side of the gas passages 152 or 154 on the electrolytically treated separator substrate 100, or a plurality of locations across the entire surface of the electrolytically treated separator substrate 100 besides the masked region as electrode connection sections, and then connecting these sections to the cathode so that the work composed of the electrolytically treated separator substrate 100 acts as the cathode, the electrocoating material can be applied to the non-masked regions by electrodeposition coating.

A material having hydrophilic functional groups such as a polyamide-based resin having amide groups can be used as the electrocoating material for forming the aqueous resin layer 26. Examples of polyamide-based resins include polyamide resins, polyamideimide resins, and amine-cured epoxy resins.

Because the polyamide-based resin contains amide groups that act as hydrophilic functional groups, the resin exhibits favorable affinity for the iron-based hydrated oxide film 24 formed on the separator substrate, and as a result, bonds tightly to the iron-based hydrated oxide film 24. As described above, because this iron-based hydrated oxide film 24 is a mixed composition containing iron hydroxide and iron oxide, a multitude of hydroxyl groups that are capable of undergoing hydrogen bonding with the amide groups in the polyamide-based resin are scattered across the surface of the iron-based hydrated oxide film. Accordingly, as shown in FIG. 5, the polyamide-based electrodeposited resin is readily compatible with the iron-based hydrated oxide film 24 on the separator substrate, enabling the resin layer 26 to be formed with a uniform thickness, and enabling a satisfactory separator sealing effect to be achieved with a thinner resin layer than has conventionally been possible.

Furthermore, following the electrodeposition coating (S204) shown in FIG. 1, the electrodeposition coated separator substrate is transported to a coating material recovery tank, and following recovery of the non-deposited coating material, the substrate is washed with water, for example using a four-stage water dipping tank system. The electrodeposition coated separator substrate surface is then dewatered using a drying air knife, subjected to a preliminary drying treatment where required, and following removal of the masking material, is subjected to a baking treatment at a predetermined temperature, for example for 30 minutes at 210° C. (S206 in FIG. 1). This completes preparation of a fuel cell separator of the embodiment described below.

[Fuel Cell Separator]

In a fuel cell separator of this embodiment, an iron-based hydrated oxide film is formed on the peripheral surfaces other than the respective gas passages of a pair of separator substrates formed from stainless steel by subjecting the peripheral surfaces of the pair of separator substrates to a cathodic electrolytic treatment within an alkali solution, and a resin layer obtained from an electrocoating material comprising an aqueous resin is formed on at least one of the iron-based hydrated oxide films provided on one of the pair of separator substrates, and the number of pinholes having a diameter of 50 to 100 μm per unit surface area of 10 cm×10 cm square of the resin layer is not more than 4.

By ensuring that the number of pinholes having a diameter of 50 to 100 μm per unit surface area of 10 cm×10 cm square of the resin layer is not more than 4, the sealing effect between the separators provided by the resin layer can be further improved, resulting in an improvement in the durability of the obtained fuel cell.

EXAMPLES

A detailed description of the fuel cell separator obtained using the method of manufacturing fuel cell separator according to the present invention is presented below using a series of examples. The scope of the present invention is in no way limited by the examples presented below.

Example 1

A substantially rectangular rubber sealing member having removable suction discs in the four corners thereof was bonded to the gas passages region of a separator substrate formed from an austenite-based stainless steel SUS304. With this masked separator substrate acting as the cathode, a sheet of a ferrite stainless steel SUS430 acting as the anode, and using an aqueous solution containing 20% by weight of sodium hydroxide, 5% by weight of trisodium phosphate dodecahydrate and 5% by weight of sodium carbonate as an electrolytic solution, a treatment was conducted within the electrolytic aqueous solution for 120 seconds at a cathode electrolytic current density of 6 A/dm$^2$, and following water washing, the sealing member was removed and the treated separator substrate was dried. The thus obtained electrolytically treated separator substrate is referred to as "separator substrate A".

A substantially rectangular rubber sealing member having removable suction discs in the four corners thereof (the masking material 29 in FIG. 3) was bonded to the gas passages region of the cathodic electrolytically treated separator substrate A, and a similar rubber sealing member was also bonded to the entire back surface on the opposite side to the membrane-sandwiching surface of the separator substrate A.

Subsequently, using the shower water washing system illustrated in FIG. 3, a water treatment was conducted by spraying both surfaces of the masked separator substrate A, namely the assembly-sandwiching surface and the opposite surface thereto, for 60 seconds with an ion-exchanged water having an electrical conductivity of 10 μS/cm, using sprayers 30 operating at a flow rate of 1 L/m$^2$ per minute.

The masked separator substrate A was then dipped, as the cathode, into a electrodeposition bath containing a concentration of 20% by weight of a cationic electrocoating material containing a hydrophilicized polyamideimide resin (Insuleed 4200, manufactured by Nippon Paint Co., Ltd.), and the bath conditions were adjusted so that the coating electrode ratio +/− was −½, the electrode spacing was 15 cm and the liquid temperature was 30° C. The applied voltage was increased so that the prescribed voltage was reached in 5 seconds, and following attainment of the prescribed voltage, the applied voltage was maintained for a period of 115 to 145 seconds, thereby effecting cationic electrodeposition coating. Following recovery of the non-deposited coating material, the separator substrate was washed with water using a four-stage water dipping tank system, the electrodeposition coated separator substrate surface was then dewatered using a drying air knife, and following preliminary drying and removal of the masking material, the substrate was subjected to a baking treatment at 260° C. for 30 minutes, thus completing preparation of a resin layer-coated separator substrate B.

Example 2

With the exception of altering the water treatment to a treatment using the water bath illustrated in FIG. 4, the separator substrate A obtained in example 1 was treated in the same manner as that described above in example 1, thus forming a resin layer-coated separator substrate C. The volume of the ion-exchanged water having an electrical conductivity of 10 μS/cm in the water tank was 200 m$^3$, and the dipping time was 60 seconds.

Comparative Example 1

A separator substrate formed from an untreated austenite-based stainless steel SUS304 that had not been subjected to the electrolytic treatment described in example 1 is referred to as "separator substrate D". A substantially rectangular rubber sealing member having removable suction discs in the four corners thereof was bonded to the gas passages region of this separator substrate D, and a similar rubber sealing member (the masking material 29 in FIG. 3) was also bonded to the entire back surface on the opposite side to the membrane-sandwiching surface of the separator substrate D. Subsequently, electrodeposition coating was performed in the same electrolytic bath and under the same electrodeposition coating conditions as those used in example 1, and water washing, dewatering, preliminary drying and baking were then conducted in the same manner as example 1, thus forming a resin layer and completing preparation of a resin-coated separator substrate E.

Comparative Example 2

With the exception of not conducting a water treatment, the separator substrate A obtained in example 1 was treated in the same manner as example 1, yielding a resin layer-coated separator substrate F.

Comparative Example 3

In the water treatment process in which the separator substrate A obtained in example 1 was sprayed on both surfaces using the sprayers 30 of the shower water washing system illustrated in FIG. 3, with the exception of spraying ethanol (special reagent grade, manufactured by Kanto Chemical Co., Inc.), which acts as an anti-foaming agent, from the sprayers instead of water, treatment was conducted in the same manner as example 1, yielding a resin layer-coated separator substrate G.

<Detection of Pinholes in Resin Layer-Coated Separator Substrates>

Figure 9:
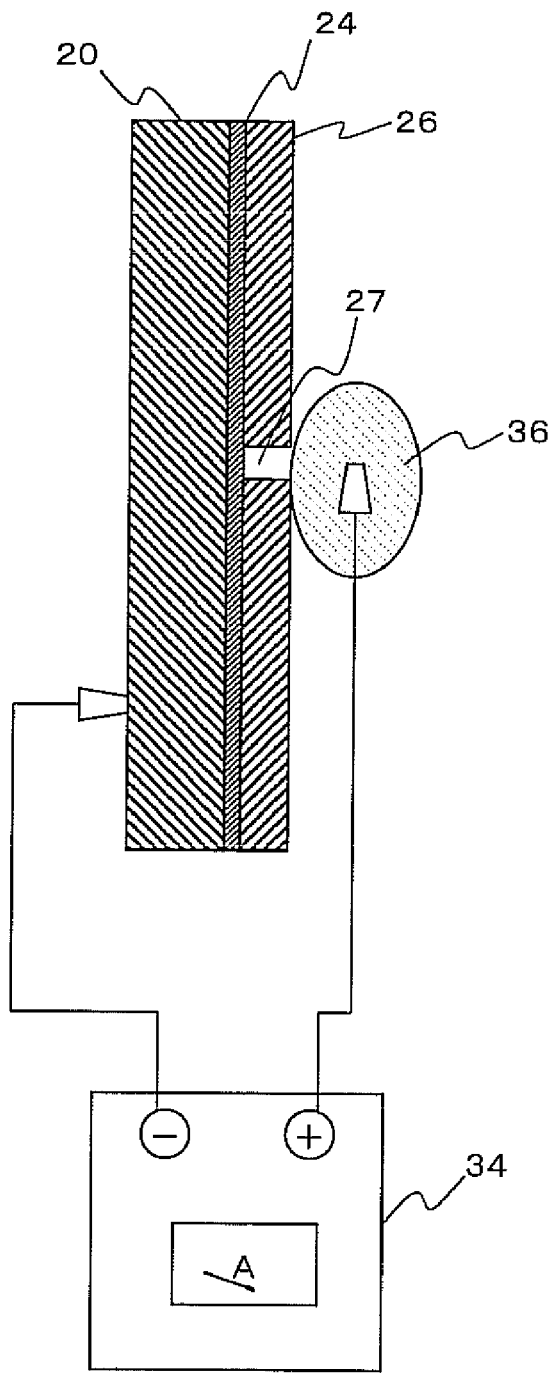
FIG. 9 is a schematic illustration describing one example of a method of detecting pinholes in an aqueous resin layer.
Figure 10:
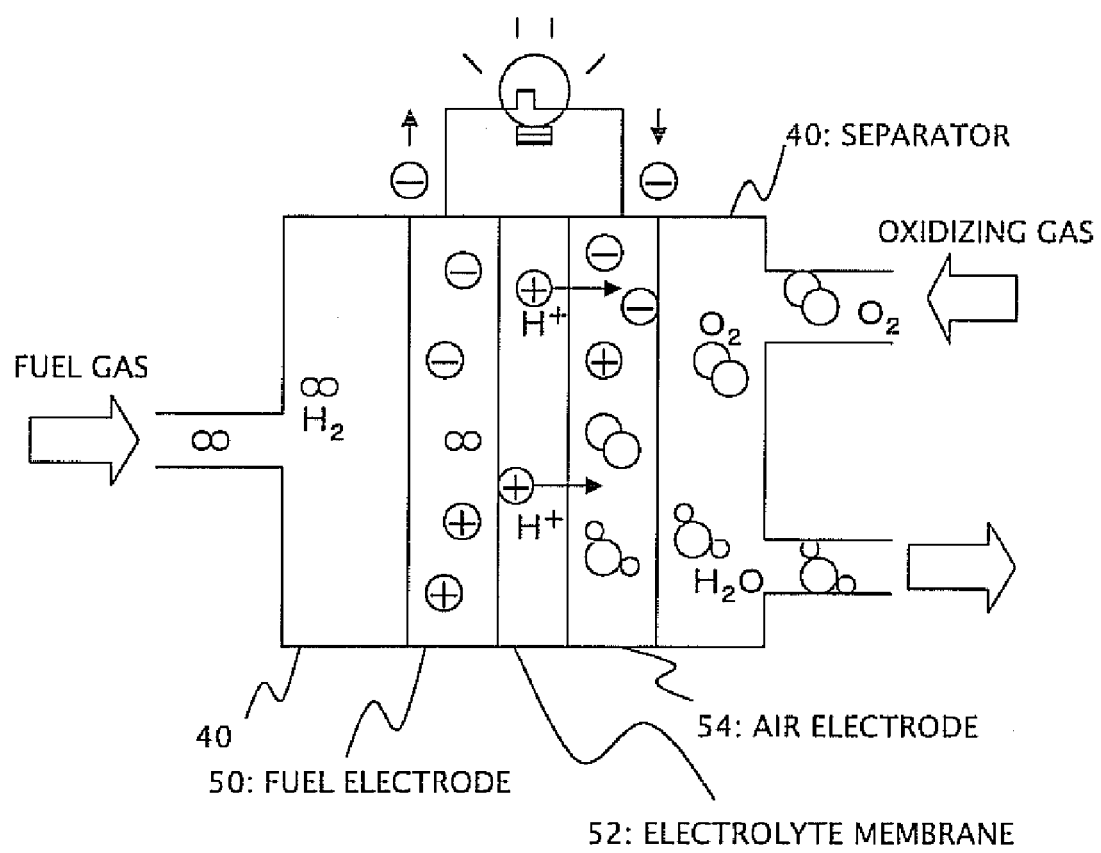
FIG. 10 is a diagram describing the structure and the mechanism of electric power generation for an individual fuel cell.
Figure 11:
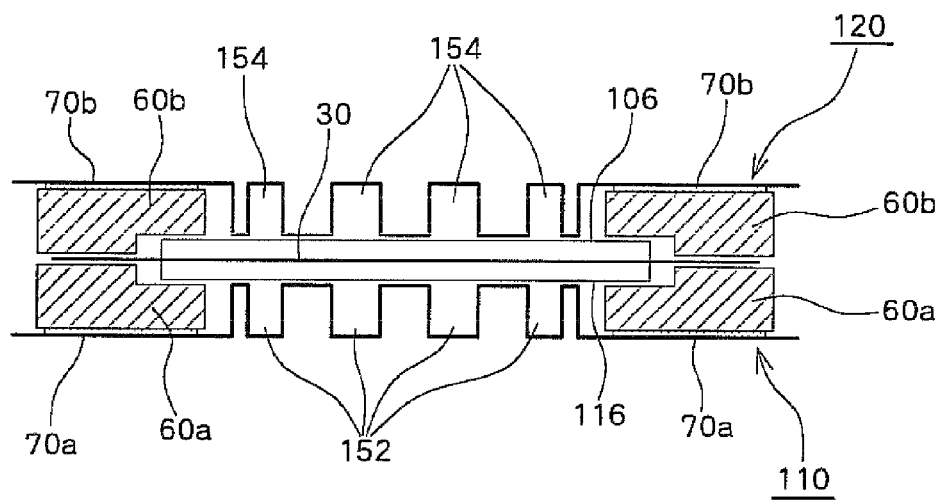
FIG. 11 is a cross-sectional view describing the structure of one configuration of a conventional fuel cell.
Figure 12:
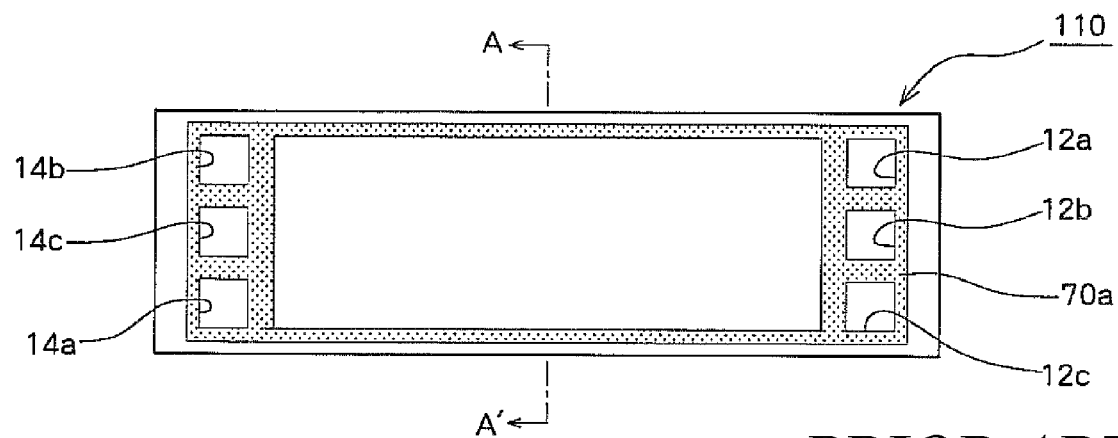
FIG. 12 is a diagram describing the position of a sealing material bonded to a separator in a conventional fuel cell.
Figure 13:
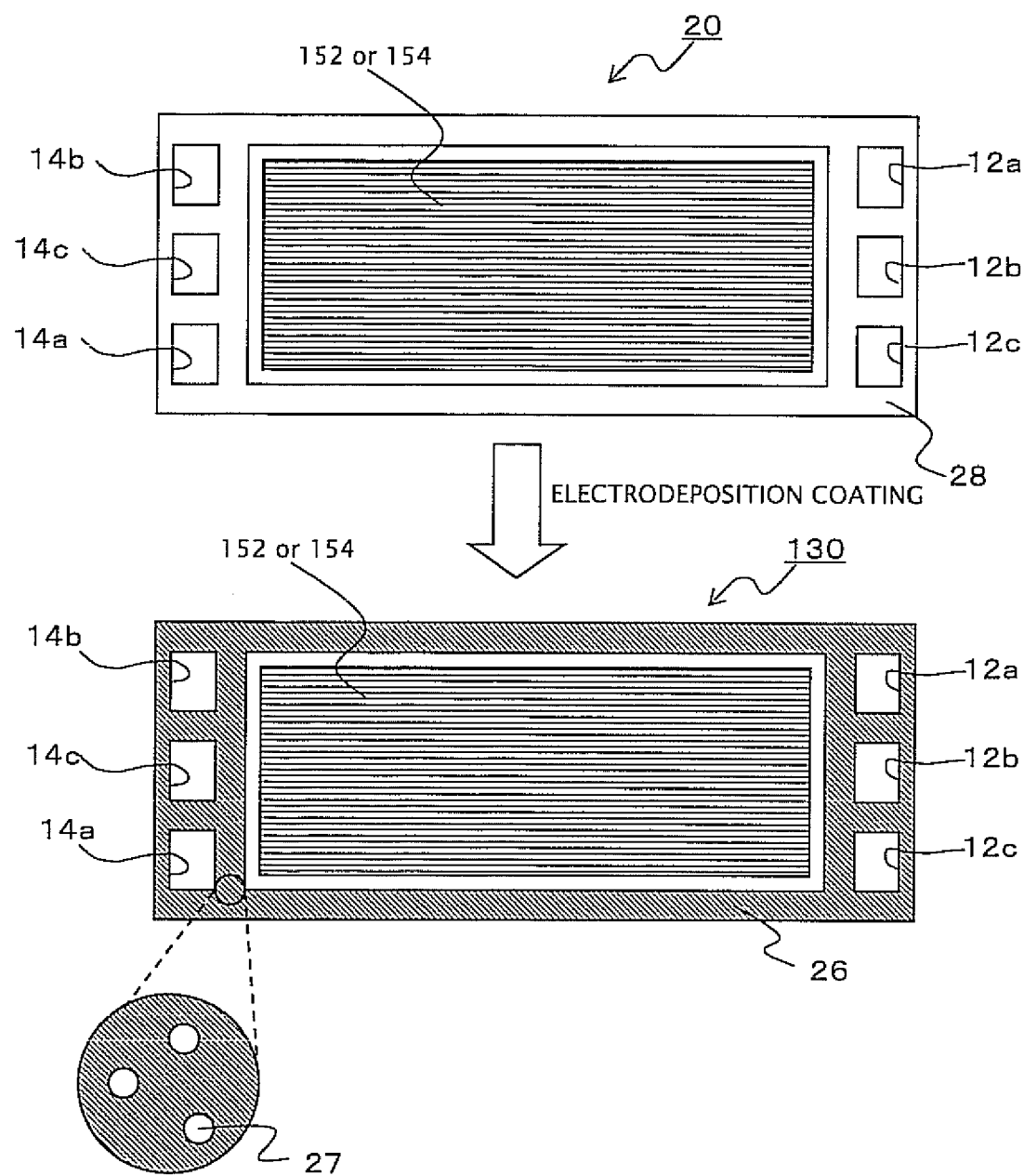
FIG. 13 is a diagram describing pinhole generation in a resin layer surface when an aqueous resin layer is formed on top of a SUS separator substrate by direct electrodeposition coating.

Using a pinhole detection method illustrated in FIG. 9, the number of pinholes having a diameter of 50 to 100 μm were measured per unit surface area of 10 cm×10 cm square of the resin layer of each resin layer-coated separator substrate. In other words, using a Tester 34 (manufactured by Hioki E.E. Corporation) shown in FIG. 9, the adjustable switch of the Tester was set to direct current measurement, the negative measurement terminal was connected to the SUS separator substrate 20 side of the resin layer-coated separator substrate, an absorbent cotton 36 soaked in a sulfuric acid-containing acidic solution+Cl⁻ (500 ppm) of pH 2.0 was wrapped around the tip of the positive measurement terminal, a voltage (25 V to 125 V) was then applied between the positive measurement terminal and the negative measurement terminal, and the positive measurement terminal with the sulfuric acid-containing absorbent cotton attached thereto was slid across the surface of the aqueous resin layer 26. When a pinhole 27 exists in the aqueous resin layer 26, then as can be seen in FIG. 9, the iron-based hydrated oxide film 24 is exposed through the pinhole 27, or if an electrolytic treatment has not been performed, then the SUS surface is exposed though the pinhole 27. As a result, the sulfuric acid solution exuded from the absorbent cotton 36 penetrates into the pinhole 27, causing a corrosion current to flow. This method was used to count the number of pinholes 27 per unit of surface area. Furthermore, the diameter of the pinholes was measured using a scanning electron microscope.

The resin layer-coated separator substrates B, C, E, F and G obtained in the examples 1 and 2, and the comparative examples 1, 2 and 3 were evaluated using the pinhole detection method described above. The results are shown in Table 1.

TABLE 1

|  | Iron-based hydrated oxide film | Water treatment | Number of pinholes per unit of surface area |
| --- | --- | --- | --- |
| Example 1 | Yes | Shower water washing | 0 |
| Example 2 | Yes | Water tank dipping | 0 |
| Comparative example 1 | No | None | 20 |
| Comparative example 2 | Yes | None | 5 |
| Comparative example 3 | Yes | Ethanol shower | 5 |

The fuel cell separator of the present invention and the method of manufacturing the fuel cell separator are effective in any application that utilizes fuel cells, and can be applied particularly favorably to fuel cells for use within vehicles.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A method of manufacturing a fuel cell separator, the method comprising:
    subjecting peripheral surfaces other than gas passages of a pair of separator substrates formed from stainless steel to a cathodic electrolytic treatment within an alkali solution, thereby forming an iron-based hydrated oxide film on the peripheral surfaces of the pair of separator substrates,
    conducting a water treatment by wetting a surface of the iron-based hydrated oxide film with water, and
    performing electrodeposition coating of an electrocoating material comprising an aqueous resin onto at least one water-treated iron-based hydrated oxide film provided on the pair of separator substrates.

2. The method of manufacturing a fuel cell separator according to claim 1, wherein
    the alkali solution is an electrolytic treatment solution,
    the electrolytic treatment solution is either a 5 to 50% by weight solution of sodium hydroxide, or an aqueous solution prepared by adding 0.2 to 20% by weight of trisodium phosphate dodecahydrate and 0.2 to 20% by weight of sodium carbonate as buffers to a 5 to 50% by weight solution of sodium hydroxide,
    a temperature of the electrolytic treatment solution is within a range from 20 to 95° C., a current density is not less than 0.5 A/dm$_2$, and a treatment time is not less than 10 seconds.

3. The method of manufacturing a fuel cell separator according to claim 2, wherein the water is an ion-exchanged water.

4. The method of manufacturing a fuel cell separator according to claim 3, wherein the aqueous resin comprises a polyamide-based resin.

5. The method of manufacturing a fuel cell separator according to claim 2, wherein the aqueous resin comprises a polyamide-based resin.

6. The method of manufacturing a fuel cell separator according to claim 1, wherein the water is an ion-exchanged water.

7. The method of manufacturing a fuel cell separator according to claim 6, wherein the aqueous resin comprises a polyamide-based resin.

8. The method of manufacturing a fuel cell separator according to claim 1, wherein the aqueous resin comprises a polyamide-based resin.

* * * * *

UNITED STATES PATENT AND TRADEMARK OFFICE
CERTIFICATE OF CORRECTION

PATENT NO. : 8,142,632 B2
APPLICATION NO. : 12/474513
DATED : March 27, 2012
INVENTOR(S) : Yusuke Watanabe et al.

It is certified that error appears in the above-identified patent and that said Letters Patent is hereby corrected as shown below:

At column 14, line number 57 delete "$A/dm_2$" insert --$A/dm^2$--.

Signed and Sealed this
Sixth Day of November, 2012

David J. Kappos
*Director of the United States Patent and Trademark Office*